United States Patent Office

Re. 26,116
Reissued Nov. 22, 1966

26,116

SUPERSONIC JET FUEL AND METHOD USING ISOPARAFFINIC HYDROCARBONS AND POLYCYCLIC HYDROCARBONS PREPARED FROM AROMATIC FRACTIONS

Robert L. Barnes, Placentia, and Robert L. Dinsmore, Long Beach, Calif., assignors to Richfield Oil Corporation, Los Angeles, Calif., a corporation of Delaware No Drawing. Original No. 3,177,653, dated Apr. 13, 1965, Ser. No. 242,888, Dec. 7, 1962. Application for reissue Mar. 23, 1966, Ser. No. 538,181
7 Claims. (Cl. 60—208)

Matter enclosed in heavy brackets [ ] appears in the original patent but forms no part of this reissue specification; matter printed in italics indicates the additions made by reissue.

The present invention relates to improved high energy fuels for supersonic aircraft, and, more particularly, relates to a blended high fuel density naphthenic type jet fuel.

High Mach number supersonic bombers, military fighters, and reconnaissance planes have severe fuel storage volume limitations which will affect the fuel capacity and range of such aircraft since thin wing section are utilized to minimize drag. Thus, supersonic transport and military aircraft, as well as long range commercial jets, require either additional fuel tanks for present fuels, or a fuel having a higher fuel density, that is, in terms of B.t.u.'s/gallon of fuel.

Straight chain and/or branch chain aliphatic hydrocarbons and mixtures thereof have been employed for aircraft engines however, their fuel density is on the order of 115,000 B.t.u.'s/gallon maximum. In the prior art it has been proposed to use as a high fuel density jet fuel the hydrogenated mixture of unsaturated polycyclic hydrocarbons boiling in the range of about 350 to 750° F. While such fuels have been found to provide higher heat of combustion per gallon, these fuels do not meet the viscosity or thermal stability requirements of military specifications for high Mach number jet fuels.

Accordingly, it is an object of the present invention to provide a high fuel density jet fuel having a heat of combustion of at least 130,000 B.t.u.'s/gallon and a minimum of 18,400 B.t.u.'s/lb.

It is also an object of the present invention to provide a high fuel density supersonic jet fuel having a low viscosity.

A further object of our present invention is to provide a high fuel density supersonic jet fuel of low viscosity having thermal stability.

Another object of the invention is to provide an improved method of operating jet engines.

Another object of my invention is to provide a method for making a high fuel density jet fuel.

Other objects and a more complete understanding of our present invention will become apparent in the present specification taken in conjunction with the appended claims.

Whe have found that a blend of a mixture of decalin and alkyl decalins with about 10 to 25% hydrogenated propylene tetramer provides a high density fuel having satisfactory fuel density thermal stability and viscosity for supersonic aircraft. The decalins used in our present invention are preferably *prepared from hydrogenated polycyclic hydrocarbons which have been* extracted from a catalytically cracked side stream petroleum fraction boiling from about 400 to 520° F. This pertoleum fraction was found to be high in naphthalenes and the extract therefrom which may be used in the fuel of our present invention was found to contain substantially all naphthalene type aromatics which upon hydrogenation to complete saturation yielded an almost completely polynaphthene stock. The aromatic portion of the petroleum side stream fraction may be separated by any of the known extraction processes, including solvent treating methods and, for example, sulfur dioxide and silica gel extractions.

We have found that the 400 to 520° F. boiling range for the polycyclic aromatic fraction is critical in that higher boiling fractions do not have the thermal stability required and have widely varying viscosity characteristics. Lower boiling fractions have higher vapor pressures and reduce the B.t.u.'s/gallon of the fuel blend such that it does not meet the proposed target specification (see Table I).

The aromatic extract is hydrogenated to substantially complete saturation according to our present invention by any conventional catalytic hydrogenation process. Fuels with substantial sulfur content may be hydrogenated with a two stage process utilizing first a desulfurization catalyst such as a cobalt-molybdenum, nickel-tungsten sulfide catalyst, etc., on a conventional alumina support with a second stage over nickel or platinum on a conventional support. Low sulfur stocks may be treated with a single stage hydrogenation utilizing only the nickel or platinum catalyst in accordance with conventional procedures. The product of the hydrogenation operation is a polynaphthene stock consisting essentially of decalin and alkyl decalins.

Properties of hydrogenated polycyclic aromatics are shown in Table I below, vis-a-vis a typical target specification for a high Mach number supersonic jet fuel. A "target" specification is not an actual fuel specification in the sense that a fuel must meet its requirements in order to be acceptable; rather, a "target" specification merely, as the name implies, gives direction to fuel manufacturers. As can be seen from these data, the viscosity of our decaline mixture is superior to that of the target specification. Several other low viscosity materials were used as blending agents to reduce the viscosity of the decalin mixture, however, the large majority of them either reduced the fuel density to a value below 130,000 B.t.u.'s/gallon or did not adequately reduce the viscosity of the blended fuel.

Thus, it was found that when hydrogenated propylene tetramer was utilized in amounts varying between 10 and 25%, the viscosity of the blended fuel was reduced to below 15 centistokes at −30° F., while the fuel density was not significantly lowered. The tetramer fraction utilized in the present invention has a boiling point in the range of 360 to 410° F. The use of tetramer as a blending agent to reduce the viscosity of the blended fuel without significantly affecting the fuel density is unexpected since the tetramer when added to a paraffinic stock having a viscosity similar to that of the polycyclic stock (decalin) does not reduce the viscosity of the resulting blended fuel. Accordingly, one would expect that it would expect that it would be necessary to utilize a less dense fuel in order to obtain a blended fuel having the desired viscosity.

As shown in Table I, the hydrogenated tetramer has a heat of combustion of 18,900 B.t.u.'s/lb. and, hence, is also useful as a blending stock to increase the heat of combustion of the blended fuel.

The blending stock of the present invention may be any stock with low freezing point and viscosity blending characteristics and which is low in n-paraffins and high in isoparaffins, such as the above-mentioned tetramer fraction or any stock from which the n-paraffins have been extracted, as with molecular sieves or by treatment with urea. For example, the catalytically cracked stock may have the n-paraffins removed to the 80% aromatic level followed by dewaxing to hold the freeze point of the aromatic stock, or the n-paraffins can be substantially completely removed and the aromatic portion blended back with the dewaxed nonaromatic portion or another highly isoparaffinic, dewaxed stock. Blending stocks having boiling temperatures below the tetramer fraction boiling range with correspondingly higher vapor pressures are not suitable as blending stocks since the resulting blended fuel is subject to excessive fuel losses at high altitudes.

The thermal stability of the fuel may be measured with a high temperature research coker at temperatures in the range of 300 to 625° F. The side stream fraction utilized with our present invention was found to be sufficiently stable to pass the standard CFR coker test without further treatment.

The freeze point of the blend fuel of our present invention should be below −55° F.

EXAMPLE I

A low sulfur catalytically cracked stock from a Thermofor Catalytic Cracking unit was taken as a side stream from a bubble tower fractionation unit. This fraction boiled between 400 and 520° F. and contained 4% naphthalenes, 9% alpha and beta methyl naphthalenes, and 22% dimethyl naphthalenes for a total of 35% naphthalenes. The aromatic portion of this fraction was separated by silica gel extraction and hydrogenated to complete saturation with a Raney nickel catalyst. The hydrogenated product consisted essentially of a mixture of decalin and alkyl decalins. This product was blended with hydrogenated propylene tetramer in amounts up to 25% of the blended fuel. The properties of the blended and unblended stocks are shown in Table I.

| | |
|---|---|
| Net heat of comb., B.t.u./lb. | 18,927 |
| Luminosity No. | 113 |
| Gravity | 53.7 |
| Density, lbs./gal. | 6.361 |
| Bromine number | 0 |
| Bromine index | Less than 10 |
| Composition by F.I.A., vol. percent: | |
| Saturates | 99.3 |
| Olefins | 0.4 |
| Aromatics or olefins | 0.3 |
| ASTM distillation, ° F.: | |
| IBP | 363 |
| 5% | 367 |
| 10% | 369 |
| 15% | 369 |
| 20% | 370 |
| 30% | 371 |
| 40% | 372 |
| 50% | 373 |
| 60% | 375 |
| 70% | 376 |
| 80% | 378 |
| 90% | 380 |
| 95% | 383 |
| EP | 407 |

In the operation of jet engines with the fuels of the present invention, air is drawn from the atmosphere into an air compressor where it is compressed and approximately one fourth of which is discharged into the combustion chamber (s) of the (gas turbine) engine where it is mixed with the fuel of the present invention, ignited and burned. The resulting hot combustion products are diluted with compresed air which has bypassed the combustion chamber, then joined with the combustion gases for cooling before reaching the first stage nozzle ahead of the first turbine. The hot gases are expanded in the turbine in such a manner that the power required to turn the compressor represents only a part of the total energy from the fuel. The high velocity hot gases expand through the turbines and reach terminal velocities at the exhaust nozzle. This produces thrust in accordance with Newton's 2nd and 3rd laws. The fuels of the present invention may also be used to operate turboprop engines in the same manner as above described except that the combustion mixture, prior to ejection through the exhaust nozzle, is expanded through a separate turbine which drives the propeller. The heat resistance of present construction materials limits the fuel to air weight ratios to approximately 0.0125 to 0.025. When richer mixtures are used, the temperatures produced at the first stage nozzle are beyond that which can be tolerated by the present construction materials.

The fuel of my present invention may be made by adding the hydrogenated tetramer to the hydrogenated polycyclic Table I

COMPARISON OF BLENDED AND UNBLENDED HIGH DENSITY NAPHTHENIC FUELS

| | Target Specifications | Fuel #1 | Tetramer | Fuel #2 | Fuel #3 |
|---|---|---|---|---|---|
| Composition, Vol. percent: | | | | | |
| Hydrogenated T-2 BTSS Fraction | | 100 | | 75 | 85. |
| Hydrogenated Propylene Tetramer | | | 100 | 25 | 15. |
| Inspections: | | | | | |
| Gravity, ° API | 26–37 | 30.4 | 52.7 | 35.2 | 33.2. |
| Freeze Point, ° F | −55 Max. | Below −90 | −110 | Below −90 | Below −90. |
| Viscosity, cs. at −30° F | 15 Max | 31.4 | 7.351 | 14.4 | 14.4. |
| Net Heat of Combustion: | | | | | |
| B.t.u./lb | 18,400 Min | 18,353 | 18,900 | 18,484 | 18,455. |
| B.t.u./gal | 135,000 Min | 133,573 | 120,204 | 130,645 | 132,000. |
| Smoke Point, mm | | 24 | | 24 | 24. |
| Luminosity Number | | 46 | | 46 | 46. |
| Thermal Stability | Stable to 625° F | (*) | | (*) | (*). |
| Thermal Decomposition Temperature | High as Possible | Not Determined | | Not Determined | Not Determined. |
| Vapor Pressure | .2 to .5 RVP | | 0.6 | | |

*Stable to the extent tested—400° F. maximum.

The blended fuel shown as Fuel #3 in Table I was found to contain the optimum properties at about 15% or between 10 and 25% hydrogenated tetramer since viscosity was under 15, the fuel density over 130,000 B.t.u.'s/gallon, and the heat of combustion in excess of 18,400 B.t.u.'s/lb. minimum of the target specification. The properties of the hydrogenated tetramer are shown in Table II.

Table II

PROPERTIES OF HYDROGENATED PROPYLENE TETRAMER

| | |
|---|---|
| Specific gravity, 60°/60° F. | 0.7649 |
| Existent gum, mg./100 ml. | 0.0 |
| Accelerated gum, mg./100 ml. | 0.0 |
| Sulfur, percent | 0.0012 |
| Reid vapor pressure | 0.6 |
| Smoke point | 50 |
| Flash point, TCC, ° F. | 138 |
| Pour point, ° F. | Below −110 |
| Freezing point, ° F. | Below −110 |
| Aniline point, ° F. | 180 |
| Viscosity at −30° F., cs. | 7.351 |

material or vice versa in any conventional refinery blending and mixing apparatus.

Although our invention has been described with a certain degree of particularity, the scope or our invention is not to be limited to the details set forth, but should be given the full breadth of the appended claims.

We claim:

1. A high fuel density blended jet fuel consisting essentially of hydrogenated polycyclic hydrocarbons *prepared from a polycyclic aromatic fraction* boiling in the range of 400 to 520° F. and from 10 to 25 volume percent of hydrogenated propylene tetramer boiling in the range of 360 to 410° F.

2. A high density blended jet fuel consisting essentially of hydrogenated polycyclic hydrocarbons selected from the group consisting of decalin and alkyl decalins *prepared from a polycyclic aromatic fraction* boiling in the range of from 400 to 520° F., and from 10 to 25 volume percent hydrogenated propylene tetramer boiling in the range of 360 to 410° F.

3. A high density blended jet fuel consisting essentially of hydrogenated polycyclic aromatic hydrocarbons selected from the group consisting of decalin and alkyl decalins *prepared from a polycyclic aromatic fraction* boiling in the range of 400 to 520° F., and from 10 to 25 volume percent of a highly isoparaffinic hydrocarbon boiling in the range of 360 to 410° F., said blended fuel having a fuel density of at least 130,000 B.t.u.'s/gallon and a maximum viscosity of 15 centistokes at —30° F.

4. A high density blended jet fuel consisting essentially of hydrogenated polycyclic aromatic hydrocarbons selected from the group consisting of decalin and alkyl decalins *prepared from a polycyclic hydrocarbon fraction* boiling in the range of 400 to 520° F. and 15 volume percent of a highly isoparaffinic hydrocarbon boiling in the range of 360 to 410° F., said blended fuel having a fuel density of at least 130,000 B.t.u.'s/gallon and a maximum viscosity of 15 centistokes at —30° F.

5. A method of operating a jet engine which comprises feeding a mixture of air and a fuel consisting essentially of hydrogenated polycyclic hydrocarbons *prepared from a polycyclic aromatic fraction* boiling in the range of 400 to 520° F. and from 10 to 25 volume percent of hydrogenated propylene tetramer boiling in the range of 360 to 410° F., subjecting said mixture to combustion, passing the resulting hot combustion gases through a turbine to partially expand the gases therein, and then discharging the hot gases into the atmosphere through a nozzle to produce thrust.

6. A high density blended jet fuel consisting essentially of hydrogenated polycyclic hydrocarbons *prepared from a polycyclic aromatic fraction* boiling in the range of 400 to 520° F., and from 10 to 25 volume percent of a highly isoparaffinic hydrocarbon, said blended fuel having a fuel density of at least 130,000 B.t.u.'s/gallon and a maximum viscosity of 15 centistokes at —30° F.

7. A high density blended jet fuel consisting essentially of hydrogenated polycyclic hydrocarbons *prepared from a polycyclic aromatic fraction* boiling in the range of 400 to 520° F. and from 10 to 25 volume percent of a dewaxed highly isoparaffinic hydrocarbon, said blended fuel having a fuel density of at least 130,000 B.t.u.'s/gallon, a maximum viscosity of 15 centistokes at —30° F. and a freeze point of below —55° F.

References Cited by the Examiner

The following references, cited by the Examiner, are of record in the patented file of this patent or the original patent.

UNITED STATES PATENTS

| | | |
|---|---|---|
| 3,105,351 | 10/1963 | Stahy. |
| 3,126,330 | 3/1964 | Zimmerschied. |
| 3,128,597 | 4/1964 | Smith et al. |

CARL D. QUARFORTH, *Primary Examiner.*

B. R. PADGETT, *Assistant Examiner.*

UNITED STATES PATENT OFFICE
CERTIFICATE OF CORRECTION

Reissue No. 26,116 November 22, 1966

Robert L. Barnes et al.

It is hereby certified that error appears in the above numbered patent requiring correction and that the said Letters Patent should read as corrected below.

Column 1, line 59, for "Whe" read -- We --; column 2, line 57, strike out "would expect that it"; column 3, line 15, for "blend" read -- blended --; columns 3 and 4 Table I fourth column, line 3 thereof, for "52.7" read -- 53.7 --.

Signed and sealed this 29th day of August 1967.

(SEAL)
Attest:

ERNEST W. SWIDER
Attesting Officer

EDWARD J. BRENNER
Commissioner of Patents